United States Patent
Duale et al.

(10) Patent No.: US 10,901,878 B2
(45) Date of Patent: Jan. 26, 2021

(54) REDUCTION OF PSEUDO-RANDOM TEST CASE GENERATION OVERHEAD

(71) Applicant: International Business Machines Corporation, Armonk, NY (US)

(72) Inventors: Ali Y. Duale, Poughkeepsie, NY (US); Dennis Wittig, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/226,013

(22) Filed: Dec. 19, 2018

(65) Prior Publication Data
US 2020/0201747 A1 Jun. 25, 2020

(51) Int. Cl.
*G06F 11/36* (2006.01)
*G06F 11/263* (2006.01)

(52) U.S. Cl.
CPC ...... *G06F 11/3684* (2013.01); *G06F 11/3664* (2013.01); *G06F 11/3688* (2013.01); *G06F 11/263* (2013.01)

(58) Field of Classification Search
CPC ................................................. G06F 11/3684
See application file for complete search history.

(56) References Cited

U.S. PATENT DOCUMENTS

| 5,572,666 | A | | 11/1996 | Whitman |
| 5,956,478 | A | * | 9/1999 | Huggins ............... G06F 11/263 712/234 |
| 6,314,510 | B1 | | 11/2001 | Saulsbury et al. |

(Continued)

FOREIGN PATENT DOCUMENTS

GB          2411025 A      8/2005

OTHER PUBLICATIONS

Egger, Bernhard, et al. "Verification of coarse-grained reconfigurable arrays through random test programs." ACM SIGPLAN Notices 53.6 (2018): 76-88. (Year: 2018).*

(Continued)

*Primary Examiner* — Matthew J Brophy
(74) *Attorney, Agent, or Firm* — Cantor Colburn LLP; Teddi Maranzano (57) ABSTRACT

Embodiments of the present invention are directed to a computer-implemented method for building and executing test cases. A non-limiting example of the computer-implemented method includes building, using a processor, a master test case instruction stream including a plurality of instructions including a replaceable instruction. The computer-implemented method builds, using the processor, a test case instruction stream derivative including the plurality of instructions including a replacement instruction in lieu of the replaceable instruction, and predicts, using the processor, a predicted result of executing the test case instruction stream derivative in a test case environment. The computer-implemented method executes, using the processor, the test case instruction stream derivative on the test case environment to generate an actual test case result and compares, using the processor, the actual test case result with the predicted result to determine proper operation of the test case environment.

15 Claims, 6 Drawing Sheets

(56) References Cited

U.S. PATENT DOCUMENTS

| | | | | |
|---|---|---|---|---|
| 6,918,025 | B2* | 7/2005 | Boutaud | G01R 31/31853 |
| | | | | 711/169 |
| 7,406,585 | B2 | 7/2008 | Rose et al. | |
| 7,627,843 | B2* | 12/2009 | Dozorets | G01R 31/31837 |
| | | | | 716/106 |
| 8,140,901 | B2* | 3/2012 | Kumar | G06F 11/2242 |
| | | | | 714/27 |
| 8,869,111 | B2 | 10/2014 | Gorthi et al. | |
| 8,887,135 | B2 | 11/2014 | Banerjee et al. | |
| 8,910,124 | B1 | 12/2014 | Bhansali et al. | |
| 9,128,732 | B2 | 9/2015 | Hunt et al. | |
| 9,552,285 | B2* | 1/2017 | Godefroid | G06F 21/577 |
| 10,176,085 | B2* | 1/2019 | Zare | G06F 11/3688 |
| 10,229,029 | B2* | 3/2019 | Tsaur | G06F 11/3093 |
| 2002/0116694 | A1* | 8/2002 | Fournier | G01R 31/31835 |
| | | | | 716/106 |
| 2003/0226002 | A1* | 12/2003 | Boutaud | G06F 9/325 |
| | | | | 712/234 |
| 2004/0059897 | A1 | 3/2004 | Rose et al. | |
| 2005/0246587 | A1* | 11/2005 | Bernick | G06F 9/52 |
| | | | | 714/38.13 |
| 2006/0156131 | A1 | 7/2006 | Kang et al. | |
| 2006/0218513 | A1* | 9/2006 | Dozorets | G06F 30/33 |
| | | | | 716/106 |
| 2011/0131452 | A1* | 6/2011 | Kumar | G06F 11/263 |
| | | | | 714/34 |
| 2012/0131386 | A1* | 5/2012 | Fournier | G06F 11/263 |
| | | | | 714/35 |
| 2013/0152048 | A1* | 6/2013 | Sato | G06F 11/3684 |
| | | | | 717/124 |
| 2013/0205388 | A1 | 8/2013 | Hunt et al. | |
| 2014/0149800 | A1* | 5/2014 | Nishimaki | G06F 11/263 |
| | | | | 714/40 |
| 2014/0310690 | A1* | 10/2014 | Yang | G06F 11/3684 |
| | | | | 717/124 |
| 2014/0331204 | A1* | 11/2014 | Godefroid | G06F 11/3636 |
| | | | | 717/124 |
| 2015/0286557 | A1* | 10/2015 | Tsaur | G06F 11/302 |
| | | | | 717/128 |
| 2016/0378646 | A1* | 12/2016 | Zare | G06F 11/3684 |
| | | | | 714/38.1 |
| 2017/0123951 | A1* | 5/2017 | Abdirashid | G06F 11/2221 |
| 2017/0123965 | A1* | 5/2017 | Abdirashid | G06F 11/3688 |
| 2018/0081795 | A1* | 3/2018 | Abdirashid | G06F 11/2205 |
| 2018/0307574 | A1* | 10/2018 | Hanif | G06F 11/183 |
| 2018/0307575 | A1* | 10/2018 | Hanif | G06F 11/165 |

OTHER PUBLICATIONS

Song, Eunjin. Coverage-driven Random Test Generation for Coarse-Grained Reconfigurable Architectures. Diss. 서울대학교 대학원, 2016. (Year: 2016).*

Mishra, Prabhat, and Nikil Dutt. "Graph-based functional test program generation for pipelined processors." Proceedings Design, Automation and Test in Europe Conference and Exhibition. vol. 1. IEEE, 2004. (Year: 2004).*

Mammo et al.; "Architectural Trace-Based Functional Coverage for Multiprocessor Verification"; 2012 13th International Workshop on Microprocessor Test and Verification (MTV); Dec. 10-13, 2012; 5 pages.

Mell et al.; "The NIST Definition of Cloud Computing—Recommendations of the National Institute of Standards and Technology"; U.S. Department of Commerce; Sep. 2011; 7 pages.

* cited by examiner

FIG. 6

REDUCTION OF PSEUDO-RANDOM TEST CASE GENERATION OVERHEAD

BACKGROUND

The present invention generally relates to test cases, and more specifically, to reduction of pseudo-random test case generation overhead.

In complex processor and operating system environments, test cases need to be generated and executed to ensure that all functions are behaving properly. As each test case is generated, predicted results are also determined. After the test cases have been executed, the results of the test cases are compared to the predicted results to determine if the test environment has functioned properly. Test cases are generated by engineers and executed on the processors and systems. It takes time and effort to generate multiple test cases that can confirm proper operation.

SUMMARY

Embodiments of the present invention are directed to a computer-implemented method for building and executing test cases. A non-limiting example of the computer-implemented method includes building, using a processor, a master test case instruction stream including a plurality of instructions including a replaceable instruction. The computer-implemented method builds, using the processor, a test case instruction stream derivative including the plurality of instructions including a replacement instruction in lieu of the replaceable instruction, and predicts, using the processor, a predicted result of executing the test case instruction stream derivative in a test case environment. The computer-implemented method executes, using the processor, the test case instruction stream derivative on the test case environment to generate an actual test case result and compares, using the processor, the actual test case result with the predicted result to determine proper operation of the test case environment.

Embodiments of the present invention are directed to a system for building and executing test cases. A non-limiting example of the system includes a memory and a processor communicatively coupled to the memory. The processor is operable to execute instructions stored in the memory. The instructions cause the processor to build, using the processor, a master test case instruction stream including a plurality of instructions including a replaceable instruction and build, using the processor, a test case instruction stream derivative including the plurality of instructions including a replacement instruction in lieu of the replaceable instruction. The instructions cause the processor to predict, using the processor, a predicted result of executing the test case instruction stream derivative in a test case environment and execute, using the processor, the test case instruction stream derivative on the test case environment to generate an actual test case result. The instructions further cause the processor to compare, using the processor, the actual test case result with the predicted result to determine proper operation of the test case environment.

Embodiments of the invention are directed to a computer program product for building and executing test cases, the computer program product comprising a computer readable storage medium having program instructions embodied therewith. The program instructions are executable by a processor to cause the processor to perform a method. A non-limiting example of the method includes building, using a processor, a master test case instruction stream including a plurality of instructions including a replaceable instruction. The computer-implemented method builds, using the processor, a test case instruction stream derivative including the plurality of instructions including a replacement instruction in lieu of the replaceable instruction, and predicts, using the processor, a predicted result of executing the test case instruction stream derivative in a test case environment. The computer-implemented method executes, using the processor, the test case instruction stream derivative on the test case environment to generate an actual test case result and compares, using the processor, the actual test case result with the predicted result to determine proper operation of the test case environment.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
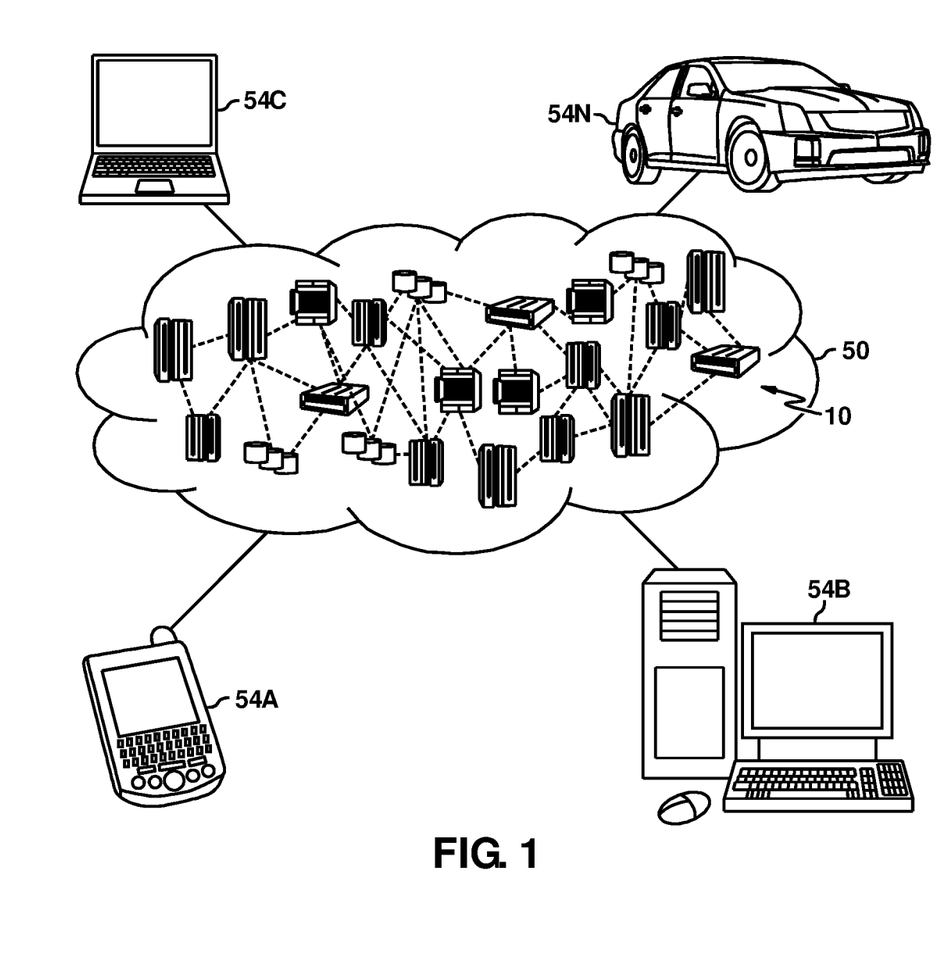
FIG. 1 depicts a cloud computing environment according to an embodiment of the present invention.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
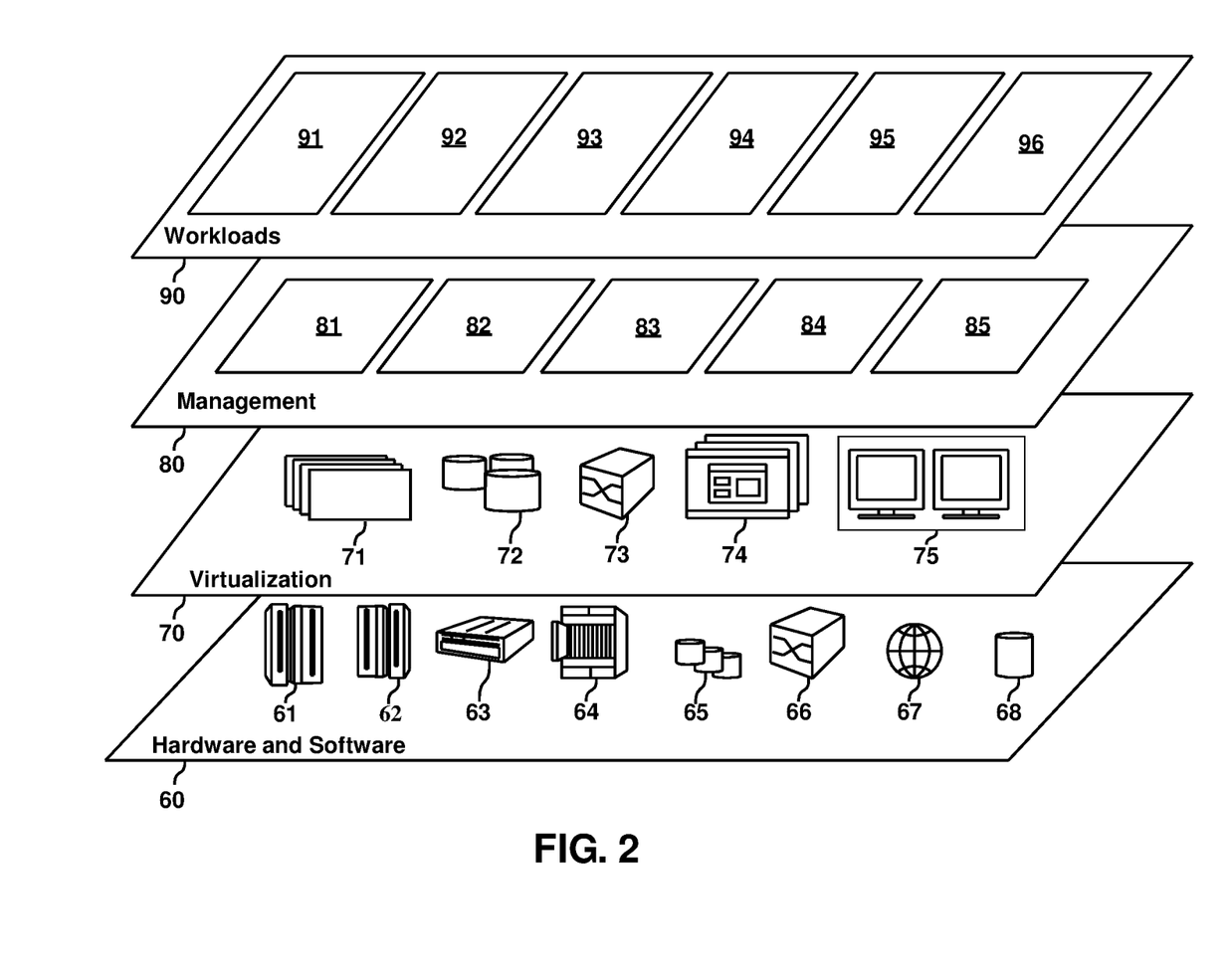
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and test case generation processing 96.

Turning now to an overview of technologies that are more specifically relevant to aspects of the invention, in complex processor and operating system environments, test cases need to be generated and executed to ensure that all functions are behaving properly. Building pseudo-random testing process comprises a number of steps. The test environment needs to be built in a pseudo-random manner. A test case instruction stream needs to be created that runs on the selected test environment. Results of the test case instruction stream need to be predicted. The test case instruction stream is executed on the machine under test in the test environment and the results are compared to the predicted results.

The time it takes for testing is a crucial delay in bringing a new product to market. The more complex the building of the test environment and the selection of test case instruction streams become, the more overhead is created to the overall test case. These first two stages of the pseudo-random test case process are good candidates for improvement.

Turning now to an overview of the aspects of the invention, one or more embodiments of the invention address the above-described shortcomings of the prior art by providing reuse of a test case environment by building a master test case instruction stream that includes a number of replaceable test case instructions within the stream. Once the master test case instruction stream is created, a number of test case instruction stream derivatives can be created automatically from the master instruction stream. For example, branch instructions may be changed to no operation ("NOP") instructions. Also, heavyweight instructions can be replaced by more lightweight instructions.

During test case build time, while building instruction streams, the method randomly selects if an instruction will be replaceable in the future. The replacement also includes modification of the instruction, in lieu of complete replacement with a different instruction. For replaceable instructions, the instruction length and type (e.g., branch instruction, move instruction, or transfer instruction) is saved. After the master test case is executed, one or more replaceable instructions are either modified or replaced with predefined instruction. Again, the replacement may be as basic as replacing an instruction with NOP.

The above-described aspects of the invention address the shortcomings of the prior art by improving the operation of a test case environment through the use of the master test case instruction stream with the generation of multiple test case instruction stream derivatives. This automates the most labor-intensive portion of the testing process, thus reducing the delay to market of new products and freeing up or reducing manpower needed during testing. This automation also is particularly useful in cases where there are many hundreds, or even thousands, of instructions that need to be tested. The operation of a computer test environment and system is greatly improved over prior systems that required individual, repeated creation of test case environments and instruction streams.

Figure 3:
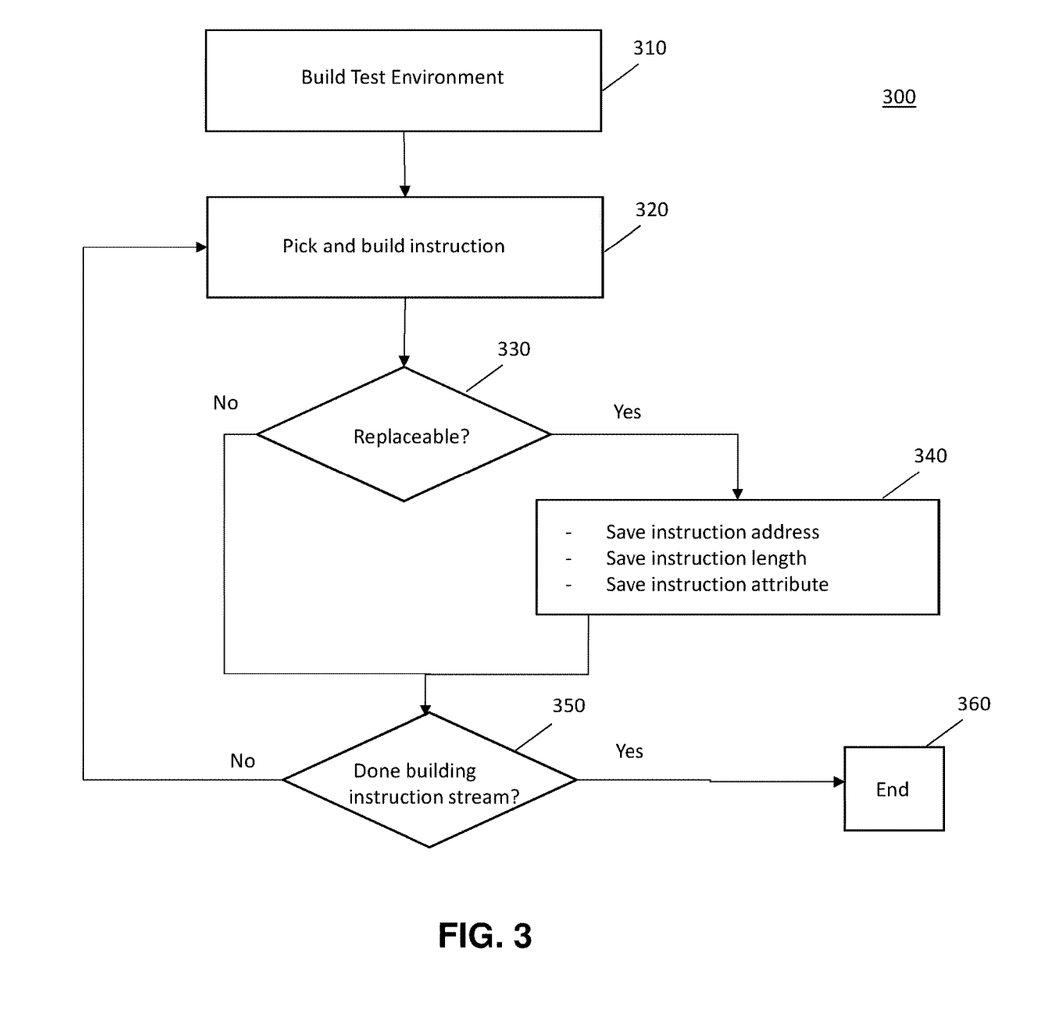
FIG. 3 depicts a flowchart of a master test case construction according to embodiments of the invention.

Turning now to a more detailed description of aspects of the present invention, FIG. 3 depicts a flowchart of a master test case construction 300 according to embodiments of the invention. The test environment is initially built. (Stage 310). Building the test case environment involves, for example, enabling certain functions of the machine, such as floating point, storage, and address space. Instructions are selected for a master test case instruction stream. (Stage 320). If the selected instruction is deemed replaceable (Stage 330), the selected instruction's address, length, and attribute (e.g., branch instruction, load instruction) is saved. (Stage 340). If more instructions need to be added to the master test case instruction stream (Stage 350), additional instructions are picked and built into the master test case instruction stream (Stage 320). If the master test case instruction stream is completed, the process ends. (Stage 360).

Figure 4:
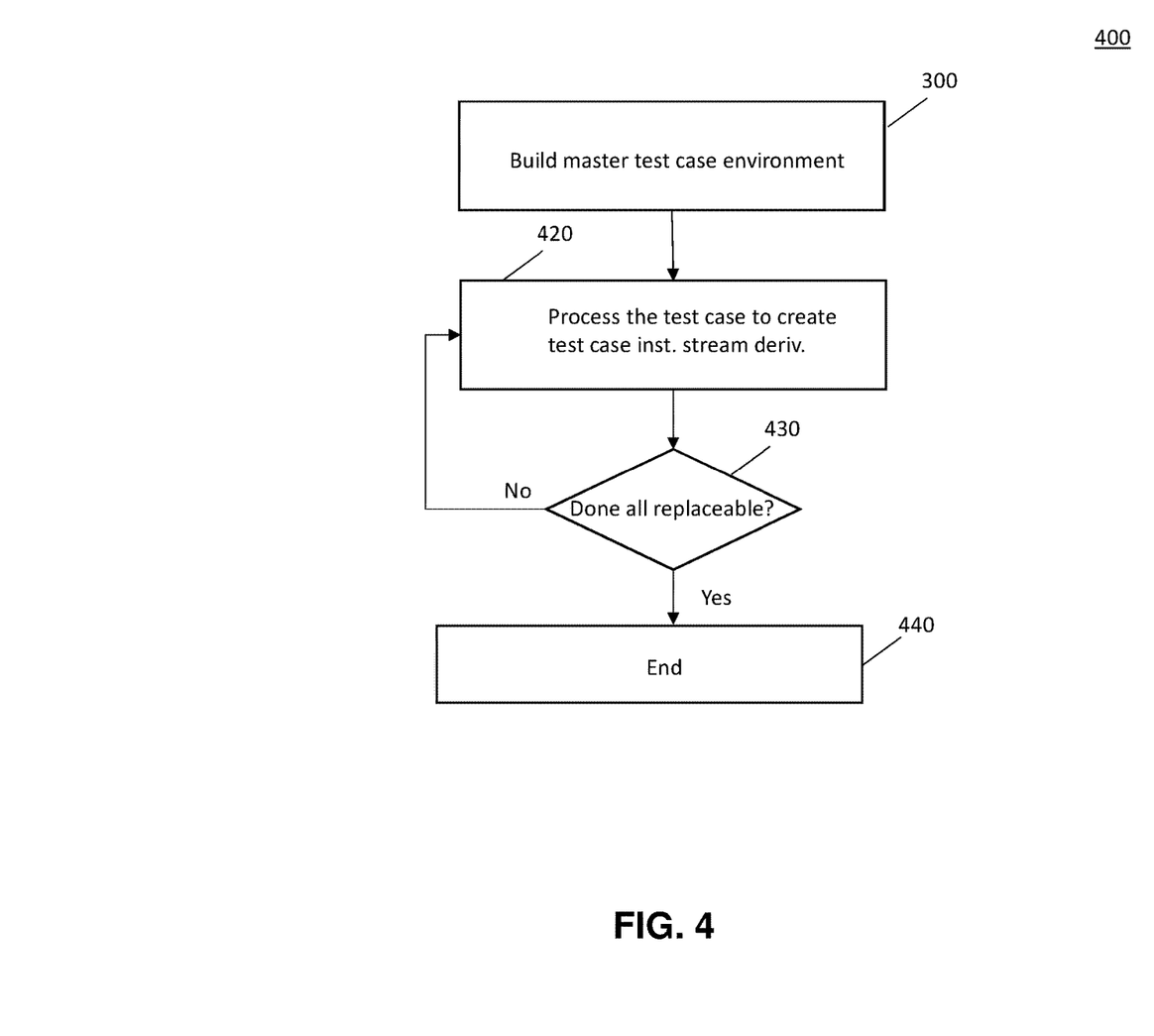
FIG. 4 depicts a flowchart of derivative test case construction according to embodiments of the invention.

FIG. 4 depicts a flowchart of derivative test case construction 400 according to embodiments of the invention. The master test case with the master test case instruction stream is constructed. (Stage 300). The master test case instruction stream is processed, replacing one or more instructions with replacement instructions or modification of the instruction(s) to create a test case instruction stream derivative. (Stage 420). If all replacements have not yet been replaced (Stage 430), the method returns to stage 420. If all replacements have been replaced, the test case construction method 400 ends. (Stage 440). The derivative test case construction method 400 may be repeated for different testing environments.

Figure 5:
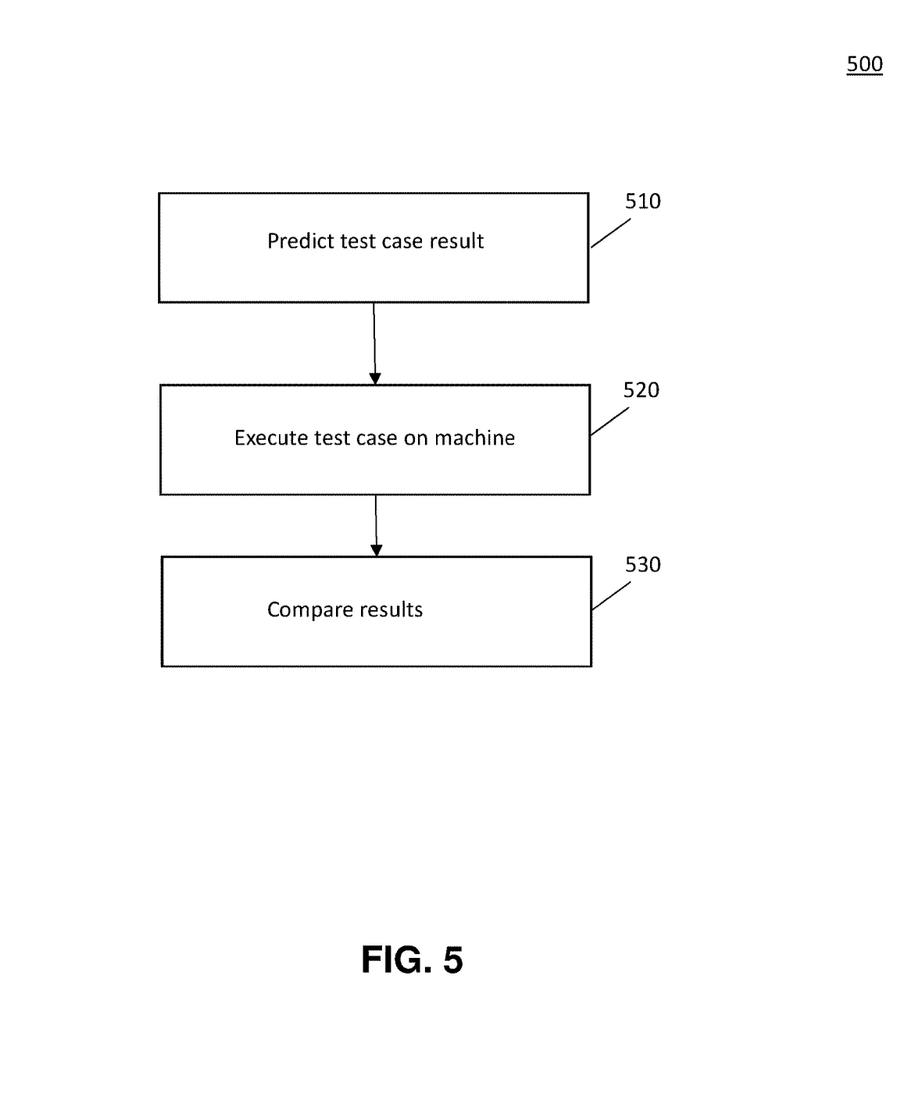
FIG. 5 depicts a flowchart of test case execution according to embodiments of the invention.

FIG. 5 depicts a flowchart of test case execution 500 according to embodiments of the invention. For a particular test case instruction stream derivative or master, a predicted test case result is generated. (Stage 510). The selected test case instruction stream derivative or master is executed in the test environment that has been created. (Stage 520). The results of the execution of the selected test case instruction stream derivative or master is compared to the predicted test case result to determine if the test environment is properly functioning. (Stage 530).

Figure 6:
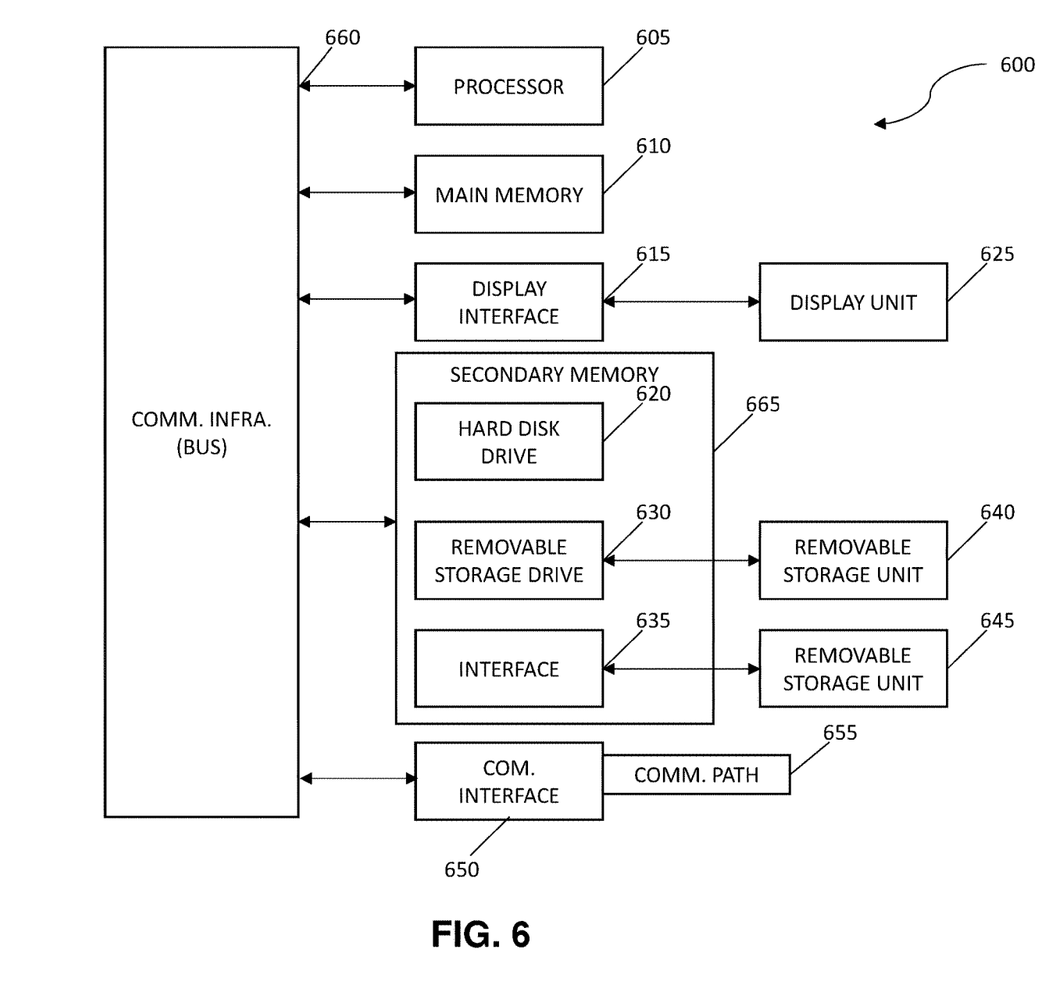
FIG. 6 depicts details of an exemplary computing system capable of implementing aspects of the invention.

FIG. 6 depicts details of an exemplary computing system capable of implementing aspects of the invention. FIG. 6 depicts a high-level block diagram computer system 600, which can be used to implement one or more aspects of the present invention. More specifically, computer system 600 can be used to implement some hardware components of embodiments of the present invention. Although one exemplary computer system 600 is shown, computer system 600 includes a communication path 655, which connects computer system 600 to additional systems (not depicted) and can include one or more wide area networks (WANs) and/or local area networks (LANs) such as the Internet, intranet(s), and/or wireless communication network(s). Computer system 600 and additional system are in communication via communication path 655, e.g., to communicate data between them.

Computer system 600 includes one or more processors, such as processor 605. Processor 605 is connected to a communication infrastructure 660 (e.g., a communications bus, cross-over bar, or network). Computer system 600 can include a display interface 615 that forwards graphics, text, and other data from communication infrastructure 660 (or from a frame buffer not shown) for display on a display unit 625. Computer system 600 also includes a main memory 610, preferably random access memory (RAM), and can also include a secondary memory 665. Secondary memory 665 can include, for example, a hard disk drive 620 and/or a removable storage drive 630, representing, for example, a floppy disk drive, a magnetic tape drive, or an optical disk drive. Removable storage drive 630 reads from and/or writes to a removable storage unit 640 in a manner well known to those having ordinary skill in the art. Removable storage unit 640 represents, for example, a floppy disk, a compact disc, a magnetic tape, or an optical disk, etc. which is read by and written to by removable storage drive 630. As will be appreciated, removable storage unit 640 includes a computer readable medium having stored therein computer software and/or data.

In alternative embodiments, secondary memory 665 can include other similar means for allowing computer programs or other instructions to be loaded into the computer system. Such means can include, for example, a removable storage unit 645 and an interface 635. Examples of such means can include a program package and package interface (such as that found in video game devices), a removable memory chip (such as an EPROM, or PROM) and associated socket, and other removable storage units 645 and interfaces 635 which allow software and data to be transferred from the removable storage unit 645 to computer system 600.

Computer system 600 can also include a communications interface 650. Communications interface 650 allows software and data to be transferred between the computer system and external devices. Examples of communications interface 650 can include a modem, a network interface (such as an Ethernet card), a communications port, or a PCM-CIA slot and card, etcetera. Software and data transferred via communications interface 650 are in the form of signals which can be, for example, electronic, electromagnetic, optical, or other signals capable of being received by communications interface 650. These signals are provided to communications interface 650 via communication path (i.e., channel) 655. Communication path 655 carries signals and can be implemented using wire or cable, fiber optics, a phone line, a cellular phone link, an RF link, and/or other communications channels.

In the present description, the terms "computer program medium," "computer usable medium," and "computer readable medium" are used to generally refer to media such as main memory 610 and secondary memory 665, removable storage drive 630, and a hard disk installed in hard disk drive 620. Computer programs (also called computer control logic) are stored in main memory 610 and/or secondary memory 665. Computer programs can also be received via communications interface 650. Such computer programs, when run, enable the computer system to perform the features of the present invention as discussed herein. In particular, the computer programs, when run, enable processor 605 to perform the features of the computer system. Accordingly, such computer programs represent controllers of the computer system.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
creating, using a processor, a master test case instruction stream including a plurality of instructions including a replaceable instruction;
creating, using the processor, a test case instruction stream derivative including the plurality of instructions and a replacement instruction in lieu of the replaceable instruction, wherein the replacement instruction is a no operation instruction, and the replaceable instruction is a branch instruction;
predicting, using the processor, a predicted result of executing the test case instruction stream derivative in a test case environment;
executing, using the processor, the test case instruction stream derivative on the test case environment to generate an actual test case result; and
comparing, using the processor, the actual test case result with the predicted result to determine proper operation of the test case environment.

2. The computer-implemented method of claim 1, wherein creating the master test case instruction stream comprises saving an instruction address, an instruction length, and an instruction attribute of the replaceable instruction.

3. The computer-implemented method of claim 1, further comprising creating, using the processor, the test case environment.

4. The computer-implemented method of claim 1, further comprising indicating, using the processor, that a second one of the plurality of instructions is a replaceable instruction.

5. The computer-implemented method of claim 4, further comprising replacing, using the processor, the second one of the plurality of instructions with a second replaceable instruction to create a second test case instruction stream derivative.

6. A system comprising:
a memory;
a processor communicatively coupled to the memory, the processor operable to execute instructions stored in the memory, the instructions causing the processor to:
create, using the processor, a master test case instruction stream including a plurality of instructions including a replaceable instruction;
create, using the processor, a test case instruction stream derivative including the plurality of instructions and a replacement instruction in lieu of the replaceable instruction, wherein the replacement instruction is a no operation instruction, and the replaceable instruction is a branch instruction;
predict, using the processor, a predicted result of executing the test case instruction stream derivative in a test case environment;
execute, using the processor, the test case instruction stream derivative on the test case environment to generate an actual test case result; and
compare, using the processor, the actual test case result with the predicted result to determine proper operation of the test case environment.

7. The system of claim 6, wherein creating the master test case instruction stream comprises saving an instruction address, an instruction length, and an instruction attribute of the replaceable instruction.

8. The system of claim 6, wherein the instructions further cause the processor to create the test case environment.

9. The system of claim 6, wherein the instructions further cause the processor to indicate that a second one of the plurality of instructions is a replaceable instruction.

10. The system of claim 9, wherein the instructions further cause the processor to replace the second one of the plurality of instructions with a second replaceable instruction to create a second test case instruction stream derivative.

11. A computer program product for creating test cases, the computer program product comprising a computer readable storage medium having program instructions embodied therewith, the program instructions executable by a computer, to cause the computer to perform a method comprising:
creating, using a processor, a master test case instruction stream including a plurality of instructions including a replaceable instruction;
creating, using the processor, a test case instruction stream derivative including the plurality of instructions and a replacement instruction in lieu of the replaceable instruction, wherein the replacement instruction is a no operation instruction, and the replaceable instruction is a branch instruction;
predicting, using the processor, a predicted result of executing the test case instruction stream derivative in a test case environment;
executing, using the processor, the test case instruction stream derivative on the test case environment to generate an actual test case result; and
comparing, using the processor, the actual test case result with the predicted result to determine proper operation of the test case environment.

12. The computer program product of claim 11, wherein creating the master test case instruction stream comprises saving an instruction address, an instruction length, and an instruction attribute of the replaceable instruction.

13. The computer program product of claim 11, wherein the method further comprises creating the test case environment.

14. The computer program product of claim 11, wherein the method further comprises indicating that a second one of the plurality of instructions is a replaceable instruction.

15. The computer program product of claim 14, wherein the method further comprises replacing the second one of the plurality of instructions with a second replaceable instruction to create a second test case instruction stream derivative.

* * * * *